(12) United States Patent
Burgman et al.

(10) Patent No.: US 7,897,261 B2
(45) Date of Patent: Mar. 1, 2011

(54) SURFACE ACTIVE ADDITIVES FOR COATINGS

(75) Inventors: John W. Burgman, Gibsonia, PA (US); Simion Coca, Pittsburg, PA (US); Edward R. Coleridge, Lower Burrell, PA (US); Heather L. Lim, North Huntingdon, PA (US); Karen A. Morow, Verona, PA (US); Jane N. Valenta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1335 days.

(21) Appl. No.: 11/178,548

(22) Filed: Jul. 11, 2005

(65) Prior Publication Data

US 2007/0009740 A1 Jan. 11, 2007

(51) Int. Cl.
*B32B 27/32* (2006.01)
*C08F 2/00* (2006.01)

(52) U.S. Cl. ........................................ 428/523; 526/72
(58) Field of Classification Search ................. 428/523; 526/72
See application file for complete search history.

(56) References Cited

U.S. PATENT DOCUMENTS 3,954,720 A 5/1976 Spoor et al. .................... 526/75
6,592,999 B1 * 7/2003 Anderson et al. ........... 428/447
2002/0086940 A1 7/2002 Ota et al. ....................... 525/74
2003/0064256 A1 * 4/2003 Sadvary et al. .............. 428/704

FOREIGN PATENT DOCUMENTS

| DE | 3545891 A1 | 9/1987 |
|---|---|---|
| EP | 1106636 A1 | 6/2001 |
| WO | WO 2004/072189 A2 | 8/2004 |

* cited by examiner

*Primary Examiner*—Kevin R. Kruer
(74) *Attorney, Agent, or Firm*—Steven W. Hays

(57) ABSTRACT

A coating composition is provided comprising (a) a polymer containing reactive functional groups; (b) a curing agent having reactive functional groups that are reactive with the functional groups in the polymer in (a); and (c) a polymeric material different from (a) and (b) having functional groups. The functional groups in components (a) and (b) are more reactive with each other than with the functional groups in component (c) such that upon curing, at least a portion of the functional groups on component (c) remain unreacted. A coating layer formed from the composition upon application to a substrate has surface regions and a bulk region, and the concentration of component (c) at one or more surface regions is greater than the concentration of component (c) in the bulk region of the coating layer. The composition can be used in multi-layer composites containing two or more coating layers.

5 Claims, No Drawings

SURFACE ACTIVE ADDITIVES FOR COATINGS

BACKGROUND OF THE INVENTION

1. Field of the Invention

The present invention relates generally to coating compositions that contain surface active additives.

2. Background of the Invention

In many instances it is desirable to enhance the properties of a coating applied to a substrate. For example, additives are often employed in automotive and architectural coating compositions to improve the appearance and/or durability of the coating as well as to enhance the strength of the adhesive bond between the coating and the substrate and/or with subsequently applied coating layers. Such additives are typically employed in all types of coating compositions including liquid coating compositions, powder coating compositions and coating dispersions applied via electrocoating techniques.

Color-plus-clear coating systems involving the application of a colored or pigmented basecoat to a substrate followed by application of a transparent or clearcoat over the basecoat have become increasingly popular as original finishes for a number of consumer products including, for example, automotive vehicles. The color-plus-clear coating systems have outstanding appearance properties such as gloss and distinctness of image, due in large part to the clearcoat. Such color-plus-clear coating systems have become popular for use with automotive vehicles, aerospace applications, floor coverings such as ceramic tiles and wood flooring, packaging coatings and the like.

Other multi-layer composite coatings are commonplace in modern coating lines. For example, a typical automotive coating system can include the sequential application of an electrodeposition primer, a primer-surfacer, a color enhancing base coat, and a transparent top coat. In some instances, the electrodeposition primer is applied over a mill-applied weldable, thermosetting coating which has been applied to the coiled steel metal substrate from which the automobile body (or body parts, such as fenders, doors and hoods) has been formed. Also, adhesive coatings, for example, windshield adhesives, trim and molding adhesives and structural adhesives are sometimes applied to the cured top coats where necessary. Motor Vehicle Safety Standards (MVSS) require that these adhesives have complete adhesion to both the windshield and the coated substrate to which they are applied. Due to these multi-layer composite coating processes, it is necessary that the previously applied coating layer have excellent intercoat or interlayer adhesion to the subsequently applied coating layer(s) and/or adhesives.

There is recent interest in the automotive coatings market in eliminating the primer-surfacer step altogether, due to the resultant cost-savings. Top coats can be directly applied to the cured electrodeposition primer. In such modified coating processes, the electrodeposition primer is required to meet stringent durability and appearance specifications. Additionally, the cured electrodepositable primer must have excellent intercoat adhesion to the subsequently applied top coats (either monocoats or color coats of a color-plus-clear system).

During the assembly process, the applied color-plus-clear coating can include surface defects in the clear coat surface which requires repair. Some automobile manufacturers elect to remove the defect and recoat the repair area with the same clear coat composition. In this instance, the cured clear coat must have excellent intercoat adhesion to the subsequently applied clear coat. It is known, however, that some clear coats when cured have poor intercoat adhesion with the subsequently applied repair clear coat.

In view of the foregoing, there remains a need in the coating industry for coating compositions which have improved properties such as acid etch resistance and mar and scratch resistance while maintaining excellent intercoat or interlayer adhesion to subsequently applied coatings and/or adhesives.

SUMMARY OF THE INVENTION

The present invention is directed a coating composition comprising:

(a) a polymer containing reactive functional groups;

(b) a curing agent having reactive functional groups that are reactive with the functional groups in the polymer in (a); and (c) a polymeric material different from (a) and (b) having functional groups. The functional groups in components (a) and (b) are more reactive with each other than with the functional groups in component (c) such that upon curing, at least a portion of the functional groups on component (c) remain unreacted. A coating layer formed from the composition upon application to a substrate has surface regions and a bulk region, and the concentration of component (c) at one or more surface regions is greater than the concentration of component (c) in the bulk region of the coating layer.

The present invention is also directed to a multi-layer composite containing at least a first coating layer and a second coating layer formed over the first coating layer thereby forming an interface region there between, where the first coating layer is formed from above-described coating composition. Component (c) in the first coating layer is present in the interface region in an amount sufficient to improve the interlayer adhesion between the first coating layer and the second coating layer compared to a composition that does not contain component (c).

DETAILED DESCRIPTION OF THE PREFERRED EMBODIMENTS

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "polymeric material" is meant to include a synthesized homopolymer, copolymer, and/or oligomer.

As used herein and in the claims, the term "thin film" refers to a film having a dry film thickness of less than 1,000 microns, typically less than 800 microns, usually within the range of 10 to 700 microns, and more usually within the range of 25 to 600 microns.

As used herein and in the claims, the terms "solubility parameter" and "$\delta$" refer to the Hildebrand solubility parameter or, as it may be referred to in polymeric systems, the cohesion parameter. Solubility parameters are determined for polymeric systems in a number of ways, non-limiting examples of which include the swelling behavior of polymers in a solvent, and cloud-point determinations in which a resin is dissolved in a true solvent and titrated with another solvent until the mixture becomes cloudy, thus identifying the range of solubility. Testing cloud-points with a variety of solvents and diluents enable a precise determination of cohesion parameter values for polymers. Other methods include, but are not limited to, a combination of empirical tests, such as cloud-point and solubility/swelling tests, with the addition of theoretical calculations based on comparing chemical structure to other materials of known solubility parameter values. The solubility parameter is typically expressed in the square root of Joules per cubic centimeter ($(J/cm^3)^{1/2}$).

As used herein, the phrase "functional groups in components (a) and (b) are more reactive with each other than with the functional groups in component (c)" means that the functional groups in the material (c), when capable of reacting with the functional groups in either of (a) or (b), react at a rate that is slower than the reaction rate of (a) and (b) with each other at temperatures of from −30° C. to 240° C. In an embodiment of the invention, the partitioning of the material (c), as described below, occurs at a rate that is greater than or equal to the reaction rate of the functional groups in the material (c) with the functional groups in (a) or (b).

In the composition of the present invention, component (c) at least partially partitions (migrates) to the surface region(s) of a coating layer upon application to a substrate. Component (c) is selected such that the solubility parameter thereof is sufficiently different from that of the mixture of (a) and (b) to cause such partitioning to take place. This can result in a concentration of material (c) at the surface region(s) which is greater than the concentration in the interior or bulk region of the coating layer. This partitioning effect of the material (c) can significantly increase its effect in providing enhanced properties to the surface of the coating layer, such as promoting the adhesion of the coating layer to a subsequently applied coating layer and to the substrate to which it is applied as well as improving crater resistance, leveling, workability, water soaking/delamination resistance, windshield adhesion and resistance to adverse environmental conditions such as acid etch resistance.

In the present invention, the difference between the solubility parameter ($\delta_{ab}$) of the coating composition without (c), i.e., the mixture comprising components (a) and (b), and the solubility parameter ($\delta_c$) of component (c) is greater than 2.

Without intending to be bound by any theory, in multilayer coating situations where component (c) is present in one or more of the coating layers, it is believed that by such phase separation discussed above, the material (c) can be present in the interface region between the first coating layer and the second coating layer, thereby providing improved interlayer adhesion between the two layers.

In one embodiment of the present invention, the first coating layer is formed from a thermosetting composition that includes components (a), (b) and (c), typically over a substrate, and includes surface region(s) and a bulk region. As used herein "surface region" of a cured coating layer of a thermosetting composition (or of the resultant polymeric layer) means the region which is generally the exposed air-coating surface interface of the cured composition (typically formed on a substrate and parallel thereto) and which has thickness generally extending perpendicularly from the surface of the cured coating layer to a depth ranging from at least 20 nanometers to 200 nanometers beneath the exposed surface. In certain embodiments, this thickness of the surface region ranges from at least 20 nanometers to 100 nanometers, and can range from at least 20 nanometers to 50 nanometers. The surface region can also refer to the region which is generally the substrate-coating interface. As used herein, "bulk region" of the cured thermosetting composition (or the resultant polymeric layer) means the region which extends beneath the surface region and which is generally parallel to the surface of the substrate to which the composition has been applied. The bulk region has a thickness extending from its interface with the surface region through the cured composition to the interface with the substrate or polymeric layer beneath the cured composition.

In some embodiments of the invention and not wishing to be bound to any particular theory, it is believed that the partitioning of the material (c) allows (c) to migrate to the surface of the coating layer and generally spread across the surface and form a layer on the surface. The formed layer can be continuous or discontinuous. In some aspects of the invention, it is believed that the material (c) can fill in valleys or pits in the coating layer surface, presenting a coating layer with a more uniform thickness and appearance. It is believed that the composition of the material (c) is sufficiently flexible and incompatible with the bulk phase containing predominantly (a) and (b) that it forms a dispersed phase or particle that migrates to the surface when the coating layer is formed or when the coating layer is cured. Further, it is believed that the dispersed or particulate form of (c) is able to open, extend, and/or assume a continuous phase orientation once it reaches the surface of the coating and is free from the bulk phase. This opening is facilitated by the general repulsive forces interacting between the functional groups in (c).

Additionally, when component (c) forms a layer ($L_1$) on the coating surface after partitioning, it typically has a surface tension lowering effect such that identical coating layers ($L_2$) comprising components (a) and (b) but not containing the material (c) will have a higher surface tension than coating layers ($L_1$) that include the material (c). In an embodiment of the invention, the surface tension lowering effect can be measured as the difference between the surface tension of $L_1$ and $L_2$, where the surface tensions are $\sigma_{L1}$ and $\sigma_{L2}$, measured in dyn/cm. Any appropriate method can be used for measuring surface tension, a non-limiting example being the contact angle method. The difference between $\sigma_{L1}$, and $\sigma_{L2}$ can be at least 0.5 dyn/cm, in some cases 1 dyn/cm, in other cases 2 dyn/cm, in some situations at least 3 dyn/cm and in other situations at least 5 dyn/cm. The difference between $\sigma_{L1}$ and $\sigma_{L2}$ will vary depending on the nature of (a) and (b) and component (c) used in the coating composition as well as the effect desired by the inclusion of component (c).

When added to the other components that form the coating composition, component (c) can be present in the composition in an amount sufficient to effect a desired change in the properties of the surface of a coating layer as described above. Component (c) can be present in the coating composition at a level of at least 0.001 weight percent, often at least 0.025 weight percent, in some cases at least 0.05 weight percent, and in other cases at least 0.10 weight percent, based on total weight of the resin solids present in the coating composition. Also, component (c), when added to the other components that form the coating composition, can be present in the coating composition in an amount of less than 5 weight percent, often less than 3 weight percent, in some cases less than 2.5 weight percent, and in other cases less than 2 weight percent, based on total weight of the resin solids present in the coating composition. The amount of component (c) present in the coating composition can vary between any of the values recited above.

The equivalent ratio of functional groups of the polymer in (a) to the curing agent in (b) is typically within the range of 1:3 to 3:1, in some cases from 1:2 to 2:1 and in other cases from 1:1.5 to 1.5:1.

In one embodiment of the present invention, the coating composition is a curable composition, for example, a thermosetting composition, that includes in (a) a polymer containing reactive functional groups, such as those described in detail below, and in (b) a curing agent having functional groups reactive with the functional groups in (a).

In an embodiment of the invention, the polymer in (a) comprises acrylic polymers, polyester polymers, polyether polymers, polyurethane polymers, polyepoxide polymers, and/or silicon-based polymers. Further, the functional groups of the polymer in (a) may comprise epoxy, carboxylic acid, anhydride, hydroxy, amide, oxazoline, isocyanate, capped isocyanate, carbamate, urethane, primary and/or secondary amine, thiol, aceto acetate, methylol, methylol ether, vinyl, and/or beta-hydroxyalkylamide.

Generally, the functional groups in (a) and (b) are selected so as to be more reactive with each other than either is with the functional groups in component (c).

In one embodiment of the present invention, the film-forming polymer of component (a) comprises a hydroxyl group, a carbamate group, an epoxy group, an isocyanate group, and/or a carboxyl group. In another embodiment, the polymer comprises a hydroxyl group and/or a carbamate group.

In a particular embodiment of the present invention, the film-forming polymer comprises an acrylic polyol having a hydroxyl equivalent weight ranging from 1000 to 100 grams per solid equivalent, usually 500 to 150 grams per solid equivalent.

Component (a) can be present in the thermosetting compositions in an amount of at least 2 percent by weight, or at least 5 percent by weight, or at least 10 percent by weight based on weight of total resin solids in the coating composition. Likewise, component (a) can be present in the thermosetting compositions of the invention in an amount less than or equal to 80 percent by weight, or less than or equal to 60 percent by weight or less than or equal to 50 percent by weight based on weight of total resin solids in the coating composition. The amount of component (a) present in the thermosetting compositions of the present invention can range between any combination of these values inclusive of the recited values.

The curing agent (b) can comprise any of a variety known in the art. Examples include an aminoplast resin, a polyisocyanate, a blocked isocyanate, a polyepoxide, a polyacid, an anhydride, an amine, including polyamines, and/or a polyol. The functional groups of the curing agent (b) are selected from epoxy, carboxylic acid, hydroxy, amide, oxazoline, acetoacetate, methylol, methylol ether, isocyanate, capped isocyanate and carbamate, beta-hydroxyalkylamide and thiol. One skilled in the art would understand that the functionality is selected so as to be reactive with the functional groups on component (a).

Other useful curing agents comprise blocked isocyanate compounds such as, for example, the tricarbamoyl triazine compounds described in detail in U.S. Pat. No. 5,084,541, column 1, line 50 through column 5, line 68, incorporated by reference herein. When used, the blocked polyisocyanate curing agent can be present, when added to the other components in the composition, in an amount ranging up to 20 weight percent or from 1 to 20 weight percent, based on the total weight of resin solids present in the composition.

When desired, appropriate mixtures of curing agents may be used. It should be mentioned that the thermosetting compositions can be formulated as a one-component composition where a curing agent such as an aminoplast resin and/or a blocked isocyanate compound such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In one embodiment of the present invention, the curing agent comprises both an aminoplast resin and a polyisocyanate.

Component (c) generally comprises compounds that have a surface active portion and a functional portion that contains functional groups and/or groups that can be converted to functional groups. As a non-limiting example, the surface active portion can include a polymer derived from (meth) acrylate esters of alcohols according to the structure $R^1$—OH, where $R^1$ is a $C_2$ to $C_{24}$ linear, branched, or cyclic alkyl group. As used herein, "(meth)acrylate" and like terms is intended to include both acrylates and methacrylates. An example of a particular embodiment includes the use of butyl acrylate as the surface active portion of component (c). In a further embodiment, the surface active portion can comprise a polymer derived from α-olefins, where the α-olefins contain from 3 to 24, in some cases 4 to 18, and in other cases 4 to 12 linear, branched, or cyclic alkyl carbon atoms. Examples of α-olefins include propylene, 1-butene, 2-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4-ethyl-1-hexene, 3-ethyl-1-hexene, 1-octene, 1-decene, 1-dodecene, 1-tetradecene, 1-hexadecene, and 1-octadecene. In an additional embodiment of the invention, the surface active portion can be a polymer comprising β,β-substituted olefins according to the Formula (I):

where $R^2$ and $R^3$ are independently $C_1$-$C_{10}$ linear, branched, or cyclic alkyl. Isobutylene (2-methylpropene) and diisobutylene (2,4,4-trimethyl-1-pentene) are suitable examples thereof. Also, the surface active portion can be a polymer derived from combinations of the monomer types disclosed above.

By "functional group" in component (c) is meant combinations of elements present in a molecule that by their structure impart specific properties to the molecule. The functional groups in (c) may be reactive functional groups or non-reactive functional groups. Non-limiting examples of suitable reactive functional groups include secondary amine, tertiary amine, secondary hydroxyl, carbamate, acid, such as carboxylic acid, anhydride, epoxide, and borate. Non-limiting examples of suitable non-reactive groups include olefinic groups and sterically hindered cyclic groups.

Any of the surface active portions described above, including combinations thereof, can be reacted with one or more functional group containing materials to form component (c).

In an embodiment of the invention, component (c) comprises a copolymer wherein the surface active portion of the copolymer is provided by residues from α-olefin monomers and the functional portion of the copolymer is provided by residues from monomers that contain suitable functional groups or that contain groups that can readily be converted to functional groups. As a non-limiting example, the α-olefins can be copolymerized with polymerizable ethylenically unsaturated monomers containing at least one acid or anhydride group. Examples include (meth)acrylic acid and anhydrides, fumaric acid and anhydride, maleic anhydride, and the like. Alternatively, the α-olefins can be copolymerized with polymerizable ethylenically unsaturated monomers containing at least one hydroxyl group and having structure II:

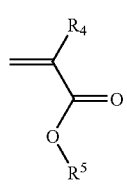

(II)

wherein $R^4$ is H or $C_1$-$C_4$ alkyl and $R^5$ comprises from —$(CHR^6)_p$—OH, —$CH_2CH_2(O—CH_2—CHR^6)_p$—OH, —$CH_2$—CHOH—$CH_2$—O—CO—$CR^7R^8R^9$, and/or —$CH_2$—$CHR^6$—O—$CH_2$—CHOH—$CH_2$—O—CO—$CR^7R^8R^9$ where $R^6$ is H or $C_1$-$C_4$ alkyl, $R^7$, $R^8$, and $R^9$ are H or $C_1$-$C_{20}$ linear or branched alkyl, and p is an integer from 0 to 20. Examples of polymerizable ethylenically unsaturated monomers containing at least one hydroxyl group that may be used in the present invention with α-olefins include, but are not limited to, hydroxyethyl(meth)acrylate, hydroxypropyl (meth)acrylate, hydroxybutyl(meth)acrylate, polyethyleneglycol ester of (meth)acrylic acid, polypropyleneglycol ester of (meth)acrylic acid, the reaction product of (meth)acrylic acid and the glycidyl ester of versatic acid, the reaction product of hydroxyethyl(meth)acrylate and the glycidyl ester of versatic acid, and the reaction product of hydroxypropyl (meth)acrylate and the glycidyl ester of versatic acid. The glycidyl ester of versatic acid is available as Cardura® Resin E-10 from Resolution Performance Products, Houston, Tex. Mixtures of such hydroxyl group-containing monomers can be used.

Caprolactone modified acrylic monomers are also suitable hydroxyl functional monomers.

The monomers that can be copolymerized with α-olefins include monomers are derived from the reaction of an ethylenically unsaturated acid functional monomer, such as monocarboxylic acids, for example, (meth)acrylic acid, and an epoxy compound that does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include CARDURA® E and those commercially available from Exxon Chemical Company under the trademark GLYDEXX®-10.

In an embodiment of the invention, the α-olefin containing copolymers can include borate functionality. Suitable examples include, but are not limited to polymeric borate esters, such as those formed by reacting an active hydrogen-containing polymer, for example, the above-described hydroxyl functional group-containing (meth)acrylic polymers with boric acid and/or a borate ester to form a polymer having borate ester groups.

In a further embodiment of the invention, the functional group portion of component (c) can include one or more carbamate functional groups, which can be incorporated into any of the above described hydroxy functional copolymers by reacting one or more hydroxyl groups with low molecular weight carbamate functional materials via a "transcarbamoylation" process. The low molecular weight carbamate functional material, which can be derived from an alcohol or glycol ether, can react with free hydroxyl groups, yielding a carbamate functional material. Reaction conditions and the ratio of reactants are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the copolymers also can be achieved by reacting isocyanic acid with free hydroxyl groups in the materials.

In another embodiment, the α-olefin containing copolymers can include secondary or tertiary amine functionality. In this embodiment, the α-olefins are copolymerized with one or more aminoalkyl(meth)acrylate monomers described by the structure III:

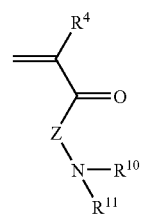

(III)

where Z is a divalent linking group; $R^{10}$ and $R^{11}$ are independently H or $C_1$-$C_6$ linear or branched aliphatic; and $R^4$ is H or $CH_3$.

The divalent linking group Z may be described as an ester having the structure —O—$R^{12}$- or an amide having the structure —N($R^{13}$)—$R^{14}$—, where $R^{13}$ is H or $C_1$-$C_6$ linear or branched aliphatic, and $R^{14}$ may be $C_1$-$C_{20}$ linear or branched alkylene, arylene, alkylarylene, ethoxylated alkylene, ethoxylated arylene, ethoxylated alkylarylene, propoxylated alkylene, propoxylated arylene, and propoxylated alkylarylene.

In an embodiment of the present invention, the aminoalkyl (meth)acrylate monomer can be selected from N,N-dimethyl, aminoethyl(meth)acrylate, N-methyl, aminoethyl(meth) acrylate or N-t-butylaminoethyl(meth)acrylate.

Embodiments of the invention are further directed to copolymers of α-olefins and two or more of the hydroxyl functional monomers, acid/anhydride functional monomers, borate functional monomers, carbamate functional monomers, and/or amine functional monomers described above.

The α-olefin copolymers can be prepared by conventional free radical polymerization methods or by controlled radical polymerization methods such as, but not limited to, those described in U.S. Pat. Nos. 6,642,301 and 4,508,880, the relevant portions of which are incorporated herein by reference.

In another embodiment of the invention, component (c) comprises a copolymer formed by copolymerizing (meth) acrylate monomers according to structure IV below as the surface active portion and one or more hydroxyl, borate, carbamate, acid, anhydride, epoxide, and/or amine functional monomers as the functional portion, including those described above. The (meth)acrylate monomers according to structure IV are described as:

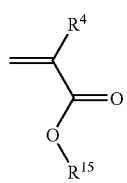

(IV)

where $R^4$ is as described above and $R^{15}$ is a $C_1$-$C_{24}$ linear, branched or cyclic alkyl group. The (meth)acrylate copolymers can be prepared by conventional free radical polymerization methods or by controlled radical polymerization methods as mentioned above.

In another embodiment of the invention, component (c) comprises a copolymer formed by copolymerizing β,β-substituted olefins according to Formula (I) above and one or more hydroxyl, borate, carbamate, acid, anhydride, epoxide, and/or amine functional monomers as the functional portion, including those described above. The copolymers can be prepared by conventional free radical polymerization methods, by controlled radical polymerization methods mentioned above, or by the methods described in U.S. Pat. No. 6,677,422, the relevant portions of which are incorporated herein by reference.

In an embodiment of the invention, component (c) can improve the appearance properties of coatings, such as gloss and distinctness of image. For example, the coating compositions can contain component (c) as a flow control agent (also referred to as a flow modifier) to improve the appearance of the cured coating. When used as a flow control agent, component (c) can exhibit surface active properties and is thought to improve the appearance of a cured coating by altering the flow and leveling of the applied coating during its cure cycle. Because component (c) contains reactive functional groups, in addition to enhancing appearance, it can also improve adhesion of the coating to the substrate over which it is applied, and/or improve the adhesion or compatibility of a subsequently applied coating. The surface flow can be enhanced because the reactive functional groups in component (c) are less reactive than the functional groups in (a) and/or (b).

In other embodiments of the invention, component (c) can improve the mar and scratch resistance of the coating, for example, by providing increased surface slip. Thus, the coatings formed from the cured coating compositions according to the present invention can have outstanding appearance properties and initial scratch (mar) resistance properties, as well as post-weathering or "retained" scratch (mar) resistance, evaluated by measuring the gloss of coated substrates before and after abrading of the coated substrates.

As indicated above, component (c) can contain reactive functional groups and when component (c) partitions to the surface of the coating, component (c) can provide cured coatings that have excellent intercoat or interlayer adhesion to subsequently applied coating layers. This improved adhesion is believed to occur because the functional groups in component (c) are available on the coating surface to react with functional groups present in components used to form the second coating layer in a multi-component composite coating. Also, in the event of damage to the cured coating system (i.e., damage causing a surface defect), it may be necessary to prepare the damaged area for repair with a subsequently applied coating composition. The coating compositions of the present invention can provide excellent intercoat adhesion between the original coating layer and the subsequently applied repair coating layer. Likewise, when used as a top coat composition, the coating compositions of the present invention can also provide excellent interlayer adhesion between the cured top coat and a subsequently applied windshield adhesive without the need to apply an adhesion promoting primer.

In one embodiment, the present invention is directed to an improved curable coating composition used to form a multi-layer composite coating comprising at least a first coating layer formed on at least a portion of a substrate, and a second coating layer formed over at least a portion of the first coating layer, where one or both the first coating layer and the second coating layer are formed from any of the curable coating compositions described above, and wherein in the absence of component (c) as described above, the first and second coating layers have poor interlayer adhesion. The improvement comprises the inclusion in the curable coating composition of component (c) as described above, present in an amount sufficient to improve the interlayer adhesion between the first coating layer and the second coating layer.

The curable coating composition of the present invention can comprise any of the foregoing thermosetting compositions described above. Also, in the multi-layer composite coating wherein both of the first and second coating layers are formed from the curable composition of the present invention, it should be understood that each of the first and second coating layers can be formed from the same or different curable coating compositions.

In a particular embodiment, the present invention is directed to a multi-layer composite coating as discussed above where one or both of the first coating layer and the second coating layer are formed from a curable coating composition formed from components comprising (a) an acrylic and/or a polyester polymer having one or more reactive functional group comprising a hydroxyl group and/or a carbamate group such as any of those described above; (b) a curing agent comprising an aminoplast resin and/or a polyisocyanate, such as those described above, and component (c) as defined above. In another embodiment, the present invention is directed to a multi-layer composite coating as discussed above where one or both of the first coating layer and the second coating layer are formed from a curable coating composition formed from components comprising (a) an acrylic and/or a polyester polymer having one or more reactive functional group comprising a hydroxyl group and/or a carbamate group; (b) a curing agent comprising an aminoplast resin and/or a blocked isocyanate comprising a tricarbamoyl triazine; and the material (c) as described above.

The curable coating compositions of the present invention can be solvent-based compositions, water-based compositions, in solid particulate form, that is, a powder composition, in the form of a powder slurry or an aqueous dispersion. The components of the present invention used to form the compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In a further embodiment, the compositions as previously described further comprise a catalyst as are well known in the art, which is present during the composition's formulation. Selection of a suitable catalyst and the amount used will be dependent upon the other composition components, as well as cure temperature and the nature of the substrate.

In another embodiment, additional components can be present in the compositions as previously described. These additional components include, but are not limited to, particles different from components (a), (b) and (c), for example, silica in colloidal, fumed, or amorphous form, alumina or colloidal alumina, titanium dioxide, cesium oxide, yttrium oxide, colloidal yttria, zirconia. e.g., colloidal or amorphous zirconia, and mixtures of any of the foregoing, flexibilizers, plasticizers, surface active agents, thixotropic agents, rheology control modifiers, anti-gassing agents, organic cosolvents, flow controllers, hindered amine light stabilizers, antioxidants, UV light absorbers, coloring agents or tints, and similar additives conventional in the art, as well as mixtures of any of the foregoing can be included in the composition.

In one embodiment, the present invention is directed to a multi-layer composite coating wherein the first curable coating composition comprises a base coating composition and the second curable composition comprises a top coating composition. In another embodiment of the present invention, the base coating composition comprises a substantially pigment-free coating composition and the top coating composition comprises a substantially pigment-free top coating composition. In an alternative embodiment of the present invention, the base coating composition comprises a pigment-containing coating composition and the top coating composition comprises a pigment-containing composition. In another embodiment of the present invention, the base coating composition comprises a pigment-containing coating composition and the top coating composition comprises a substantially pigment-free coating composition. In another embodiment of the present invention, the base coating composition comprises a substantially pigment-free base coating composition and the top coating composition comprises a pigment-containing coating composition.

As used herein, by "substantially pigment-free coating composition" is meant a coating composition which forms a transparent coating, such as a clearcoat in a multi-component composite coating composition. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

The pigment-containing coating compositions can comprise any of the pigmented compositions commonly used in the coatings industry. For example, the pigment-containing coating composition can comprise a primer coating composition, such as a pigmented thermosetting weldable primer coating composition, for example, those commercially available under the tradename BONAZINC, an electrodepositable coating composition such as ED-5000, a primer-surfacer coating composition such as GPX45379, a color-enhancing base coat such as HWB-9517, and ODCT6373, all available from PPG Industries, Inc. of Pittsburgh, Pa., or an adhesive composition such as those used as automotive windshield adhesives, for example, BETASEAL 15625, available from Essex Specialty Products.

Likewise, the pigment-free curable coating composition can comprise any of the pigment-free coatings known in the art such as those used as clear coats in color-plus-clear coating systems for the automotive industry. Non-limiting examples include TKU-1050AR, ODCT8000, and those available under the tradenames DIAMOND COAT and NCT, all commercially available from PPG Industries, Inc.

In another embodiment, the present invention is directed to multi-component composite coating compositions comprising a basecoat deposited from a pigment-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. It should be understood that one or both of the base coating composition and the top coating composition can be formed from the curable coating compositions of the present invention.

Where the basecoat is not formed from a composition of the present invention (but the topcoat is formed from a curable coating composition of the present invention) the coating composition of the basecoat in the color-plus-clear system can be any of the compositions useful in coatings applications, particularly automotive applications. The coating composition of the basecoat can comprise a resinous binder and a pigment to act as the colorant, as well as optional additives well known in the art of coating compositions. Nonlimiting examples of resinous binders are acrylic polymers, polyesters, alkyds, and polyurethanes.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used. Resultant film thicknesses may vary as desired.

After forming a film of the basecoat on the substrate, the basecoat can be cured or alternatively given a drying step in which solvent is driven out of the basecoat film by heating or an air drying period before application of the clearcoat. Suitable drying conditions may depend, for example, on the particular basecoat composition, and on the ambient humidity if the composition is water-borne.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the curable coating composition of the present invention. Alternatively, only one of the first topcoat and the second topcoat is formed from the curable coating composition of the present invention.

In this instance, the topcoat that does not comprise the curable coating composition of the present invention can include any of the crosslinkable coating compositions comprising a thermosettable coating material and a curing agent.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne.

The film-forming composition of the present invention when employed as a second topcoat coating composition can be applied as described above for the first topcoat by any conventional coating application technique. Curing conditions can be those described above for the topcoat.

It should be mentioned that the coating compositions of the present invention can be advantageously formulated as a "monocoat", that is a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In one embodiment, the present invention is directed to a method of repairing a multi-layer composite coating comprising a base coat formed on a substrate from a film-forming base coating composition and a first top coat deposited over at least a portion of the base coat, the first top coat formed from a first film-forming top coating composition comprising any of the foregoing coating compositions, the method comprising locating an area of the composite coating which is flawed, and applying a repair top coat film-forming composition to the flawed area after the flawed area has been prepared for repairing. The repair top coat film-forming composition can comprise a film-forming composition which is the same or different from the first top coat film-forming composition. The flawed area can be any coating blemish that cannot be polished out, for example dirt particles in the coating surface. The flawed area typically can be abraded or sanded to remove such coating blemishes. In a repair carried out in accordance with the method of the present invention, the first top coating can provide excellent intercoat adhesion with the subsequently applied repair top coating.

The coating compositions of the present invention can provide cured coatings having excellent intercoat or interlayer adhesion to subsequently applied coating layers. For example, any of the aforementioned substantially pigment-free coating compositions can be applied as a transparent clearcoat in a color-plus-clear coating system as discussed above. In the event of damage to the cured coating system causing a surface defect, it may be necessary to prepare the damaged area for repair with a subsequently applied clear coat composition. The coating compositions of the present invention can provide excellent intercoat adhesion between the first clear coat layer and the subsequently applied repair clear coat layer. Likewise, when used as a top coat composition, the coating compositions of the present invention also provide excellent interlayer adhesion between the cured top coat and a subsequently applied windshield adhesive without the intervening step of applying an adhesion promoting primer.

Illustrating the invention are the following examples that are not to be considered as limiting the invention to their details. All parts and percentages in the examples, as well as throughout the specification, are by weight unless otherwise indicated.

EXAMPLE A

| Charge Number | Ingredients | Solids (grams) | Weight (grams) |
|---|---|---|---|
| #1 | CARDURA E[1] | 1200 | 1200 |
| #2 | Di-Tert-Amyl Peroxide | 0 | 18.4 |
|  | Acrylic Acid | 360 | 360 |
|  | 1-Octene | 560 | 560 |
| #3 | AROMATIC 100[2] | 0 | 700 |

[1]Epoxide functional ester, available from Resolution Performance Products.
[2]Blend of aromatic solvents available from Exxon Mobil Chemicals.

Charge #1 was introduced to a reaction flask equipped with an agitator, thermocouple, nitrogen inlet, and a reflux condenser, and heated to 165° C. under a nitrogen blanket. Charge #2 was added over 2 hours. The reaction vessel was held at reflux for 2 hours. The flask was set for total distillation and heated to 165° C. Distillate was removed to 165° C. The reaction mixture was held until the COOH equivalent weight was greater than 11000 grams/COOH (Acid Value <5). The mixture was cooled to <120° C. and Charge #3 was added. Non-volatile content was determined to be 70% by holding a sample of the reaction mixture at 110° C. for 1 hour. The hydroxyl number was determined by STM-0217 and found to be 95.1. The final copolymer had an $M_n$=2290 and $M_w/M_n$=2.8.

EXAMPLE B

| Charge | Ingredients | Solids | Weight |
|---|---|---|---|
| #1 | 1-Octene | 600 | 600 |
| #2 | Di-tert-Amyl Peroxide | 20 | 20 |
| #3 | Butyl Acrylate | 620 | 620 |
| #3 | Hydroxypropyl Acrylate | 780 | 780 |
| #4 | AROMATIC 100 | 0 | 500 |

Charge #1 was introduced to a stainless steel pressure reaction vessel equipped with an agitator, thermocouple, and a nitrogen inlet. Reactor vessel pressure was increased to 5 PSI with nitrogen, and the charge heated to 150° C. Charge #2 and #3 were added over 2 hours. After Charge #2 and #3 were complete, the reaction mixture was held for 2 hours at 150° C. Charge #4 was then added while cooling to ambient temperature.

The resulting copolymer was determined to be 78% solids as measured at 110° C. for 1 hour. The hydroxyl number was determined by STM 0217 to be 133. The copolymer had an Mn=3282 and an $M_w/M_n$=3.8 (determined by gel permeation chromatography using polystyrene standards).

A carbamoylated polymer was prepared from the following ingredients:

| Chemical | Amount in g |
|---|---|
| Hydroxypropyl acrylate/butyl acrylate/ 1-octene copolymer from above | 634.5 |
| Methyl Carbamate | 112.5 |
| Butyl Stannoic Acid | 0.9 |
| Triphenylphosphite | 2.1 |
| AROMATIC 100 | 45.6 |

The first four ingredients were charged to a suitable reactor equipped with a stirrer, thermocouple, condenser, and $N_2$ inlet and heated to 140° C. under a nitrogen blanket. The reaction mixture was held between 140° and 144° C. for 2 hours. During this time reflux was observed. At the end of the hold period, the reaction mixture temperature was reduced to just below reflux temperature; the reactor was then equipped for atmospheric distillation with a short packed column. The temperature of the reaction mixture was increased until distillation was observed. Distillate was collected over a period of 4.5 hours in a reaction temperature range of 151° to 170° C. A total of 28.1 g of distillate was collected. The reaction mixture was reduced to final solids with Aromatic 100. The resulting resin had a viscosity (Gardner-Holt bubble tube) Z7+, a measured solids (110° C., 1 hr) of 75.7%, a number average molecular weight of 3302, a weight average molecular weight of 21308, and a polydispersity of 6.45 as determined by gel permeation chromatography vs. a polystyrene standard.

EXAMPLE C

| Charge | Ingredients | Solids (grams) | Weight (grams) |
|---|---|---|---|
| #1 | 1-Decene | 841.8 | 841.8 |
| #2 | LUPEROX 575[1] | 0 | 20 |
| #3 | ACE Monomer[2] | 1333.4 | 1333.4 |

[1]t-Amylperoxy(2-ethyl hexanoate), available from Arkema, Inc.
[2]Reaction product of acrylic acid and CARDURA E.

Charge 1 was introduced to a stainless steel pressure reaction vessel equipped with an agitator, thermocouple, and a nitrogen inlet, and the reactor vessel pressure raised to 5 PSI with nitrogen. The charge was heated to 100° C., and Charge #2 was added over 2.5 hours. Charge #3 was started fifteen minutes after starting Charge #2, over 2 hours. After Charge #2 was complete the reaction mixture was held for 2 hours at 100° C.

The resulting copolymer was determined to be 72.6% solids as measured at 110° C. for 1 hour. The hydroxyl number was determined by STM 0217 to be 103.3. The copolymer had an $M_n$=8256 and a $M_w/M_n$=2.6 (determined by gel permeation chromatography using polystyrene standards).

EXAMPLE D

A 2 L flask was flushed with $N_2$ and charged with 1125 g of DOWANOL PM[1] and 103.1 g of boric acid. The reaction was heated to reflux with agitation. The reaction was held for 2 hours at reflux followed by the removal of 452.1 g of solvent. The reaction temperature was increased to maintain reflux. The resulting mixture was cooled, poured and used without further purification. Initial reflux temperature was 112° C., final reflux temperature was 212° C., and the resulting copolymer was determined to be 13% solids as measured at 110° C. for 1 hour.

[1]Propylene glycol methyl ether, commercially available from Dow Chemical Company

EXAMPLE E

| | Ingredients | Parts by weight (grams) |
|---|---|---|
| Charge 1 | Diisobutylene | 224.00 |
| Charge 2 | LUPEROX 575 | 6.00 |
| Charge 3 | ACE Monomer | 421.00 |

Charge 1 was added a reaction flask equipped with an agitator, a thermocouple, and a $N_2$ inlet, placed under blanket of $N_2$, and heated to 103° C. Charge 2 was added to reactor over 4 hours. After 15 minutes Charge 3 was added to reactor over 4 hours. During the monomer addition the temperature was maintained at 103° C. After Charges 2 and 3 were in the reactor, the reaction mixture was held for 2 hours. The reactor was than cooled to 25° C. Gas chromatography (GC) analysis of reaction mixture showed that ACE was reacted. The reaction flask was then equipped for simple vacuum distillation, the reaction mixture heated to 80° C. to remove the unreacted diisobutylene and replace with butyl acetate. The solids of the resulting polymer was determined to be 79.9% determined at 110° C. for one hour The copolymer had number average molecular weight, Mn=5270 and polydispersity $M_w/M_n$=2.1 (determined by gel permeation chromatography using polystyrene as a standard). The $^1$H-NMR show the copolymer composition is 66.7% ACE and 33.3% diisobutylene.

EXAMPLE F

| Charge | Ingredients | Solids | weight |
|---|---|---|---|
| #1 | AROMATIC 100 | 0 | 220 |
| #1 | Diisobutylene | 920 | 920 |
| #2 | LUPEROX 575 | 20 | 20 |
| #3 | Isobutylene | 200 | 200 |
| #4 | ACE Monomer | 1340 | 1340 |

Charge 1 was introduced to a stainless steel pressure reaction vessel equipped with an agitator, thermocouple, and a nitrogen inlet. The reactor vessel pressure was raised to 5 PSI with nitrogen and the charge heated to 100° C. Charge #2 was added over 2.5 hours. Charges #3 and #4 were started fifteen minutes after starting Charge #2, over 2 hours. After Charge #2 was complete the reaction mixture was held for 2 hours at 100° C.

The resulting copolymer was determined to be 83.8% solids as measured at 110° C. for 1 hour. The hydroxyl number was determined by STM 0217 to be 124.7. The copolymer had an $M_n=11419$ and a $M_w/M_n=2.3$ (determined by gel permeation chromatography using polystyrene standards).

EXAMPLE G

| Charge | Ingredients | Solids | weight |
|---|---|---|---|
| #1 | AROMATIC 100 | 0 | 374 |
| #2 | LUPEROX 575 | 24 | 24 |
| #3 | Isobutylene | 660 | 660 |

| Charge | Ingredients | Solids (grams) | Weight (grams) |
|---|---|---|---|
| #1 | AROMATIC 100 | 0 | 200 |
| #1 | 1-Octene | 613.3 | 613.3 |
| #2 | LUPEROX 575 | 20 | 20 |
| #3 | Dimethylaminoethyl Methacrylate | 160 | 160 |
| #3 | ACE Monomer | 1226.7 | 1226.7 |
| #4 | ACE Monomer | 1340 | 1340 |

Charge 1 was introduced to a stainless steel pressure reaction vessel equipped with an agitator, thermocouple, and a nitrogen inlet, and the reactor vessel pressure raised to 5 PSI with nitrogen. The charge was heated to 100° C., and Charges #2, #3, and #4 were added over 2 hours. After Charges #2, #3, #4 were complete, the reaction mixture was held for 2 hours at 100° C.

The resulting copolymer was determined to be 78.6% solids as measured at 110° C. for 1 hour. The hydroxyl number was determined by STM 0217 to be 119. The copolymer had an $M_n=11782$ and a $M_w/M_n=4.2$ (determined by gel permeation chromatography using polystyrene standards).

EXAMPLE H

Charge #1 was introduced to a reaction flask equipped with an agitator, thermocouple, nitrogen Inlet, and a reflux condenser, and heated to reflux (110° C.) under a nitrogen blanket. Charges #2 and #3 were added over 2 hours. The reaction vessel was held at reflux for 2 hours. The flask was set for total distillation and heated to 150° C. Distillate was removed to 150° C. The mixture was cooled to ambient temperature. Non-volatile content was determined to be 82.7% by holding a sample of the reaction mixture at 110° C. for 1 hour. The final copolymer had an Mn=4694 and $M_w/M_n=2.5$ (determined by gel permeation chromatography using polystyrene standards).

EXAMPLE I

| | Ingredients | Parts by weight (grams) |
|---|---|---|
| Charge 1 | Diisobutylene | 224.00 |
| Charge 2 | LUPEROX 575 | 1.50 |
| Charge 3 | ACE Monomer | 421.00 |
| | 2-(Dimethylamino)ethyl acrylate(DMAEA) | 54.00 |

Charge 1 was added a reaction flask equipped with an agitator, a thermocouple, and a $N_2$ inlet, placed under blanket of $N_2$, and heated to 103° C. Charge 2 was added to reactor over 4 hours. After 15 minutes Charge 3 was added to reactor over 4 hours. During the monomer addition the temperature was maintained at 103° C. After Charge 2 and 3 were in the reactor, the reaction mixture was held for 2 hours. The reactor was then cooled to 25° C. GC analysis of reaction mixture showed that all the acrylate monomers were reacted. The reaction flask was than equipped for simple vacuum distillation, the reaction mixture heated to 80° C. to remove the unreacted diisobutylene and replace with butyl acetate. The solids of the resulting polymer was 75.82% determined at 110° C. for one hour. The copolymer had number average molecular weight, Mn=4752 and polydispersity $M_w/M_n=1.8$ (determined by gel permeation chromatography using polystyrene as a standard).

EXAMPLE J

| | Ingredients | Parts by weight (grams) |
|---|---|---|
| Charge 1 | Butyl acetate | 200.00 |
| Charge 2 | LUPEROX 575 | 20.00 |
| Charge 3 | ACE Monomer | 421.00 |
| | 2-(Dimethylamino)ethyl acrylate(DMAEA) | 54.00 |
| | Butyl Acrylate (BA) | 224.00 |

Charge 1 was added a reaction flask equipped with an agitator, a thermocouple, and a $N_2$ inlet, placed under blanket of $N_2$, and heated to 110° C. Charge 2 was added to reactor over 4 hours. After 15 minutes Charge 3 was added to reactor over 4 hours. During the monomer addition the temperature was maintained at 110° C. After Charges 2 and 3 were in the reactor, the reaction mixture was held for 2 hours. The reactor was then cooled to 25° C. GC analysis of reaction mixture showed that all the monomers were reacted. The solids of the resulting polymer was 73.92% determined at 110° C. for one hour. The copolymer had number average molecular weight, Mn=3560 and polydispersity $M_w/M_n=2.1$ (determined by gel permeation chromatography using polystyrene as a standard).

Film Forming Compositions

Formulation Pre-Mixtures: (Each Component was Mixed Sequentially with Agitation)

| Premixture 1 | | |
|---|---|---|
| Ingredient | Parts by weight (grams) | Solid weights (grams) |
| Xylene | 3.9 | — |
| Ethyl-3-Ethoxypropanoate | 3.5 | — |
| AROMATIC 150 | 8.6 | — |
| BUTYL CELLOSOLVE acetate[1] | 1.8 | — |
| Odorless Mineral Spirits | 1.8 | — |
| Butyl CARBITOL[2] | 2.9 | — |
| Butyl CARBITOL acetate[3] | 3.5 | — |
| Tridecyl Alcohol | 3.5 | — |
| AROMATIC 100 | 3.7 | — |
| TINUVIN 928[4] | 2.0 | 2.00 |
| TINUVIN 292[5] | 0.8 | 0.80 |
| TINUVIN 123[6] | 0.8 | 0.80 |
| Acid catalyst[7] | 0.7 | 0.5 |
| LUWIPAL 018[8] | 31.4 | 29.0 |
| LAROTACT LR 9018[9] | 9.2 | 4.60 |

-continued

| Premixture 1 | | |
|---|---|---|
| Ingredient | Parts by weight (grams) | Solid weights (grams) |
| Acrylic[10] | 63.7 | 41.4 |
| SETALUX C-71761 VB-60[11] | 41.7 | 25.0 |
| Reduction Information: | | |
| AROMATIC 100 | 40 | |
| Spray viscosity[12] (sec) | 28 | |
| Paint temperature (° F.) | 72 | |

[1]2-Butoxyethyl acetate solvent is commercially available from Union Carbide Corp.
[2]Diethylene glycol monobutyl ether available from Union Carbide Corp.
[3]2-(2-Butoxyethoxy) ethyl acetate is commercially available from Union Carbide Corp.
[4]2-(2H-Benzotriazol-2yl)-6-(1-methyl-1-phenylethyl)-4-(1,1,3,3-tetramethylbutyl)phenol UV absorber available from Ciba Specialty Chemicals Corp.
[5]Sterically hindered amine light stabilizer commercially available from Ciba Additives.
[6]Bis-(1-octyloxy-2,2,6,6-tetramethyl-4-piperidinyl) sebacate hindered aminoether light stabilizer available from Ciba Additives.
[7]Dodecyl benzene sulfonic acid solution available from Chemcentral.
[8]High imino, butylated melamine formaldehyde resin commercially available from Akzo-Nobel.
[9]Available from BASF AG.
[10]A polymer comprising Cardura E, styrene, hydroxyethyl methacrylate, 2-ethylhexyl acrylate, acrylic acid at an Mw of about 8000 having a hydroxy EW on solids of 370. Polymer is 65% by weight solids in Xylene/Soivesso 100 (available from Exxon) at a weight ratio of 34/66.
[11]SCA acrylic resin solution from Akzo
[12]Viscosity measured in seconds with a #4 FORD efflux cup at ambient temperature.

TABLE 1

| Ingredient | Example 1 (Comparative) | Example 2 | Example 3 | Example 4 |
|---|---|---|---|---|
| Premixture 1 | 104 (224) | 104 (224) | 104 (224) | 104 (224) |
| ADDITOL XL-121[1] | 0.003 (0.02) | — | — | — |
| WORLEE 315[2] | 0.047 (0.39) | — | — | — |
| Example A Octene/ACE | — | 2 (2.9) | — | — |
| Example B Octene/HPA/Carb | — | — | 2.0 (2.6) | — |
| Example C Decene/ACE | — | — | — | 2.0 (2.6) |

[1]A leveling agent available from UCB Chemicals.
[2]A flow control agent available from Worlee Chemie.

| Premixture 2 | | |
|---|---|---|
| Ingredient | Parts by weight (grams) | Solid weights (grams) |
| Diisobutyl ketone | 17.32 | — |
| DOWANOL DPM[1] | 2.68 | — |
| AROMATIC 100 | 6.1 | — |
| DOWANOL PM Acetate[2] | 11.3 | — |
| TINUVIN 900[3] | 1.12 | 1.12 |
| TINUVIN 328[4] | 1.55 | 1.55 |
| Acrylic Rheology Control Agent[5] | 6.18 | 1.85 |
| Anti-sag Solution[6] | 6.53 | 2.60 |
| RESIMENE 757[7] | 41.5 | 40.27 |
| Isobutyl alcohol | 2.58 | — |
| Carbamoylated acrylic[8] | 24.73 | 15.3 |
| Carbamoylated polyester[9] | 54.4 | 39.4 |
| TINUVIN 292[10] | 0.33 | 0.33 |
| Acid catalyst[11] | 1.24 | 0.87 |
| Reduction Information: | | |
| Diisobutyl Ketone | 6.5 | |
| Spray viscosity[12] (sec) | 30 | |
| Paint temperature (° F.) | 75 | |

[1]Dipropylene glycol monomethyl ether, available from Dow Chemical Co.
[2]Methyl ether propylene glycol acetate, available from Dow Chemical Co.
[3]Benzotriazole derivative available from CIBA Additives.
[4]2-(2'-Hydroxy-3',5'-ditert-amylphenyl) benzotriazole UV light stabilizer available from Ciba Additives.
[5]A crosslinked polymeric dispersion comprising ethylene glycol dimethacrylate, styrene, butyl acrylate, and methyl methacrylate. The dispersion is 31% by weight in oxo-hexyl acetate (available from Exxon Chemicals). The number average particle size is 1000 angstroms.
[6]A dispersion containing AEROSIL R812 S silica (available from Degussa), and a polymeric component which comprises hydroxy propyl acrylate, styrene, butyl methacrylate, butyl methacrylate acrylic acid at an Mw of 7000 having a hydroxy EW on solids of 325. Polymer is 67.5% by weight solids in methyl ether of propylene glycol monoacetate/SOLVESSO 100 (available from Exxon) at a weight ratio of 60/40.
[7]Melamine formaldehyde resin commercially available from Solutia Inc.
[8]Carbamate functional acrylic.
[9]Carbamate functional polyester resin solution.
[10]Sterically hindered amine light stabilizer commercially available from Ciba Additives.
[11]Dodecyl benzene sulfonic acid solution available from Chemcentral.
[12]Viscosity measured in seconds with a #4 FORD efflux cup at ambient temperature

TABLE 2

| Ingredient | Example 5 (Comp) | Example 6 (Comp) | Example 7 (Comp) | Example 8 | Example 9 | Example 10 | Example 11 |
|---|---|---|---|---|---|---|---|
| Premixture 2 | 103 (184) | 103 (184) | 103 (184) | 103 (184) | 103 (184) | 103 (184) | 103 (184) |
| Polybutyl acrylate[1] | 0.38 (0.64) | — | — | — | — | — | — |
| DISPARLON OX-60[2] | 0.05 (0.10) | — | — | — | — | — | — |
| Example D (borate ester) | — | 0.56 (4.31) | — | 0.56 (4.31) | 0.56 (4.31) | 0.56 (4.31) | 0.56 (4.31) |
| Example A (Octene/ACE) | — | — | 0.50 (0.67) | 0.50 (0.67) | — | — | — |
| Example E DIB/ACE | — | — | — | — | 2 (2.50) | — | — |
| Example F DIB/IB/ACE | — | — | — | — | — | 2 (2.4) | — |
| Example G IB/ACE | — | — | — | — | — | — | 2 (5.13) |

[1]A flow control agent having a Mw of about 6700 and a Mn of about 2600 made in xylene at 62.5% solids available from DuPont.
[2]Additive available from King Industries.

TABLE 3

| Ingredient | Example 5 (Comp) | Example 12 | Example 13 | Example 14 | Example 15 | Example 16 | Example 17 |
|---|---|---|---|---|---|---|---|
| Premixture 2 | 103 (184) | 103 (184) | 103 (184) | 103 (184) | 103 (184) | 103 (184) | 103 (184) |
| Polybutyl acrylate[1] | 0.38 (0.64) | — | — | — | — | — | — |
| DISPARLON OX-60[2] | 0.05 (0.10) | — | — | — | — | — | — |
| Example H (octene/ACE/DMAEMA) | — | 0.25 (0.3) | 0.50 (0.60) | 1.0 (1.2) | 2.0 (2.4) | — | — |
| Example I (DIB/ACE/DMAEA) | — | — | — | — | — | 2 (2.6) | — |
| Example J (BA/ACE/DMAEA) | — | — | — | — | — | — | 1 (1.35) |

[1] A flow control agent having a Mw of about 6700 and a Mn of about 2600 made in xylene at 62.5% solids available from DuPont.
[2] Additive available from King Industries.

Testing

The film forming compositions of Examples 1-17 were spray applied to a pigmented basecoat to form color-plus-clear composite coatings over primed electrocoated steel panels. The panels used were cold rolled steel panels (size 4 inches×12 inches (10.16 cm by 30.48 cm)). Panels for examples 1 through 4 were coated with ED6060 electrocoat and 1177225A primer, both available from PPG Industries, Inc. For examples 5 through 17, panels were coated with ED6230B electrocoat and FCP6519 primer, both available from PPG Industries, Inc.

Examples 1 through 4 used Panther Black, a black-pigmented solvent-based acrylic/melamine basecoat, available from PPG Industries, Inc. A black-pigmented solvent-based acrylic/melamine basecoat, DCT6373, available from PPG Industries, Inc. was used for examples 5, 6, 7, 9, 10, 11, 15, & 16. A red-pigmented solvent-based acrylic/melamine basecoat, DCT7089, available from PPG Industries, Inc. was used for examples 8, 12, 13, 14 & 17.

Basecoats were automated spray applied to the electrocoated and primed steel panels at ambient temperature (about 70° F. (21° C.)). A dry film thickness of about 0.6 to 0.8 mils (about 15 to 20 micrometers) was targeted for the basecoats. The panels were only given an air flash at ambient temperature for one to five minutes.

The clear coating compositions were each automated spray applied to a basecoated panel at ambient temperature in two coats with an ambient flash between applications. Clearcoats were targeted for a 1.6 to 1.8 mils (about 41 to 46 micrometers) dry film thickness. All coatings were allowed to air flash at ambient temperature before the oven. Panels were baked for thirty minutes at 285° F. (141° C.) to fully cure the coating(s). The panels were baked in a horizontal position. Properties for the coatings are reported below in Tables 4 and 5 below.

TABLE 4

| Example # | Initial 20° Gloss[1] | DOI[2] | 3 Day Acid Resistance[3] | Total Surface Energy[4] (dynes/cm) |
|---|---|---|---|---|
| 1 (Comparative) | 96 | 94 | 2 | 34 |
| 2 | 96 | 93 | 0 | |
| 3 | 96 | 84 | 0 | |
| 4 | 94 | 93 | 0 | 34 |

[1] 20° gloss was measured with a Statistical Novo-Gloss 20° gloss meter, available from Paul N. Gardner Company, Inc.
[2] Distinctness-of-image (DOI) measurement was measured with a Hunter Associates Dorigon II ™ DOI meter.
[3] Acid testing was performed as follows. Two 50 microliter droplets of 38% sulfuric acid solution were applied to each test panel leaving an adequate distance around each droplet to allow a scintillation vial lid to cover it. The rack containing the test panels is placed into a pre-equilibrated 23° C./40% RH HOTPACK ™ controlled humidity oven for 3 days.. The caps are removed, the panel is thoroughly rinsed with deionized water and carefully blotted dry to prevent scratches. The area exposed to each acid droplet is inspected for damage, i.e. visual changes to the clearcoat by the acid solution. The rating scale ranges from 0-5 where a 0 rating indicates an absence of defects, 1 rating indicates slight defect but no gloss loss or color change, 2 rating indicates a slight loss of gloss, 3 rating indicates distinct loss of gloss or color, 4 rating indicates a few blisters or film softening and 5 rating indicates many blisters, film softening and/or swelling.
[4] Surface energies were measured using Video Contact Angle Analyzer VCA2500XE and the solutions used for the measurements were water and methylene iodide. The geometric equation was used for calculating panel surface energies.

TABLE 5

| Example # | Initial 20° Gloss[1] | DOI[2] | Quick Knife Adhesion[3] (% Cohesive Failure) | Total Surface Energy[4] (dynes/cm) |
|---|---|---|---|---|
| 5 (Comp) | 86 | 96 | 0 | 42 |
| 6 (Comp) | 86 | 93 | 0 | |
| 7 (Comp) | 87 | 95 | 0 | |
| 8 | 86 | 96 | 100 | 35 |
| 9 | 86 | 95 | 100 | |
| 10 | 86 | 93 | 100 | |
| 11 | 85 | 96 | 100 | |
| 12 | 89 | 87 | 100 | |
| 13 | 87 | 83 | 100 | |
| 14 | 89 | 88 | 90 | 38 |
| 15 | 87 | 95 | 100 | |

TABLE 5-continued

| Example # | Initial 20° Gloss[1] | DOI[2] | Quick Knife Adhesion[3] (% Cohesive Failure) | Total Surface Energy[4] (dynes/cm) |
|---|---|---|---|---|
| 16 | 83 | 87 | 100 | |
| 17 | 87 | 84 | 100 | |

[1] 20° gloss was measured with a Statistical Novo-Gloss 20° gloss meter, available from Paul N. Gardner Company, Inc.
[2] Distinctness-of-image (DOI) measurement was measured with a Hunter Associates Dorigon II™ DOI meter.
[3] Quick Knife Testing was performed as follows: In order to test for windshield adhesion, a bead of windshield adhesive is applied to the clear coat surface within 1-4 hours following the final bake (30 minutes at 285° F.). The Betaseal urethane moisture cure windshield adhesive 15625 obtained from Dow Automotive was used. Approximately a 5 mm × 5 mm × 250 mm adhesive bead is placed on the cured color plus clear substrate. The adhesive is cured for 72 hours at room temperature (~75° F.) and 20-50% relative humidity. After 72 hours, the cured adhesive bead is cut with a razor blade. A cut is made through the adhesive bead at a 60° angle at 12 mm intervals while pulling back the edge of the adhesive at a 180° angle. A minimum of 10 cuts is done for each system. The desired result is described as 90-100% cohesive failure (CF). Cohesive failure (CF) occurs when the integrity of the adhesive bead is lost as a result of cutting and pulling. When adhesion loss occurs between the adhesive bead and clearcoat surface, the cohesive failure rating is 0%.
[4] Surface energies were measured using Video Contact Angle Analyzer VCA2500XE and the solutions used for the measurements were water and methylene iodide. The geometric equation was used for calculating panel surface energies.

We claim:

1. A coating composition comprising:
   (a) a polymer containing reactive functional groups;
   (b) a curing agent having reactive functional groups that are reactive with the functional groups in the polymer in (a); and
   (c) a polymeric material different from (a) and (b), comprising functional groups, wherein the functional groups in components (a) and (b) are more reactive with each other than with the functional groups in component (c) such that upon curing, at least a portion of the functional groups on component (c) remain unreacted; and wherein a coating layer formed from the composition upon application to a substrate has surface regions and a bulk region, and the concentration of component (c) at one or more surface regions is greater than the concentration of component (c) in the bulk region of the coating layer; and wherein the coating composition is substantially pigment-free; and wherein component (c) comprises a copolymer formed by copolymerizing one or more functional monomers containing borate as the functional portion and a β,β-substituted olefin having the Formula (I):

$$H_2C=CR^2R^3 \tag{I}$$

wherein $R^2$ and $R^3$ are independently $C_1$-$C_{10}$ linear, branched, or cyclic.

2. The composition of claim 1, wherein the difference between the solubility parameter $\delta_{ab}$ of the mixture of components (a) and (b) and the solubility parameter $\epsilon_c$ of component (c) is greater than 2.

3. The composition of claim 1, wherein a coating layer L1 formed therefrom has a surface tension $\sigma_{L1}$ at least 0.5 dyn/cm lower than the surface tension $\sigma_{L2}$ of a coating layer $L_2$ comprising components (a) and (b) that does not contain component (c).

4. A multi-component composite coating composition comprising at least a first coating layer and a second coating layer formed over the first coating layer thereby forming an interface region therebetween, wherein the first coating layer is formed from the coating composition according to claim 1, and wherein component (c) in the first coating layer is present in the interface region in an amount sufficient to improve the interlayer adhesion between the first coating layer and the second coating layer compared to a composition that does not contain component (c).

5. A multi-component composite coating composition comprising at least a first coating layer and a second coating layer deposited over at least a portion of the first coating layer, and wherein the second coating composition comprises a coating composition comprising:
   (a) a polymer containing reactive functional groups;
   (b) a curing agent having reactive functional groups that are reactive with the functional groups in the polymer in (a); and
   (c) a polymeric material different from (a) and (b), comprising functional groups, wherein the functional groups in components (a) and (b) are more reactive with each other than with the functional groups in component (c) such that upon curing, at least a portion of the functional groups on component (c) remain unreacted; and wherein a coating layer formed from the composition upon application to a substrate has surface regions and a bulk region, and the concentration of component (c) at one or more surface regions is greater than the concentration of component (c) in the bulk region of the coating layer; and wherein the coating composition is substantially pigment-free, wherein component (c) comprises a copolymer formed by copolymerizing one or more functional monomers containing borate as the functional portion and a β,β-substituted olefin having the Formula (I):

$$H_2C=CR^2R^3 \tag{I}$$

herein $R^2$ and $R^3$ are independently $C_1$-$C_{10}$ linear, branched, or cyclic.

* * * * *